(12) United States Patent
Gasper

(10) Patent No.: US 8,871,848 B2
(45) Date of Patent: Oct. 28, 2014

(54) COATING COMPOSITIONS FOR GOLF BALLS AND COATED GOLF BALLS

(75) Inventor: Kelly J. Gasper, Aliquippa, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 335 days.

(21) Appl. No.: 13/297,339

(22) Filed: Nov. 16, 2011

(65) Prior Publication Data
US 2013/0123046 A1    May 16, 2013

(51) Int. Cl.
| | |
|---|---|
| C09D 175/04 | (2006.01) |
| C09D 7/12 | (2006.01) |
| A63B 37/00 | (2006.01) |
| C08G 18/10 | (2006.01) |
| C08G 18/48 | (2006.01) |
| C08L 75/04 | (2006.01) |
| G09F 23/00 | (2006.01) |

(52) U.S. Cl.
CPC ............ *C08G 18/10* (2013.01); *A63B 37/0074* (2013.01); *C08G 18/4854* (2013.01); *A63B 37/0076* (2013.01); *A63B 37/0075* (2013.01); *A63B 37/0073* (2013.01); *A63B 37/0022* (2013.01); *A63B 37/0003* (2013.01); *C08L 75/04* (2013.01); *G09F 23/00* (2013.01); *C09D 175/04* (2013.01); *C08G 18/48* (2013.01)
USPC ........... 524/405; 524/183; 524/184; 524/185; 524/404; 524/701; 525/457; 525/458; 528/27; 528/28

(58) Field of Classification Search
None
See application file for complete search history.

(56) References Cited

U.S. PATENT DOCUMENTS

| | | | |
|---|---|---|---|
| 4,046,729 A * | 9/1977 | Scriven et al. | ................ 524/589 |
| 5,156,405 A | 10/1992 | Kitaoh et al. | |
| 5,409,233 A | 4/1995 | Kennedy | |
| 5,459,220 A | 10/1995 | Kennedy | |
| 5,494,291 A | 2/1996 | Kennedy | |
| 5,502,100 A | 3/1996 | Maruoka et al. | |
| 5,506,292 A | 4/1996 | Horiuchi et al. | |
| 5,540,438 A | 7/1996 | Horiuchi et al. | |
| 5,725,443 A | 3/1998 | Sugimoto et al. | |
| 5,766,097 A | 6/1998 | Horiuchi et al. | |
| 5,789,486 A | 8/1998 | Maruoka et al. | |
| 5,817,735 A * | 10/1998 | Hatch et al. | ................ 528/84 |
| 5,820,491 A | 10/1998 | Hatch et al. | |
| 5,967,906 A | 10/1999 | Horiuchi et al. | |
| 6,018,012 A | 1/2000 | Crast et al. | |
| 6,063,859 A | 5/2000 | Yamamoto et al. | |
| 6,096,851 A | 8/2000 | Maruoka et al. | |
| 6,100,361 A | 8/2000 | Keller | |
| 6,146,288 A | 11/2000 | Crast et al. | |
| 6,155,569 A | 12/2000 | Horiuchi et al. | |
| 6,180,714 B1 | 1/2001 | Ohira et al. | |
| 6,210,295 B1 | 4/2001 | Yoneyama | |
| 6,248,804 B1 * | 6/2001 | Lutz | ................ 523/160 |
| 6,284,835 B1 | 9/2001 | Ellison | |
| 6,309,706 B2 | 10/2001 | Maruoka et al. | |
| 6,312,347 B1 | 11/2001 | Keller | |
| 6,340,503 B1 | 1/2002 | Simonds et al. | |
| 6,365,679 B1 | 4/2002 | Crast et al. | |
| 6,395,861 B1 | 5/2002 | Kennedy, III | |
| 6,398,669 B1 | 6/2002 | Yokota et al. | |
| 6,454,667 B1 | 9/2002 | Iwami | |
| 6,485,377 B1 | 11/2002 | Crast et al. | |
| 6,488,596 B1 | 12/2002 | Maruoka et al. | |
| 6,617,378 B2 | 9/2003 | Ohira et al. | |
| 6,623,791 B2 * | 9/2003 | Sadvary et al. | ................ 427/140 |
| 6,639,024 B2 | 10/2003 | Simonds et al. | |
| 6,676,543 B2 | 1/2004 | Endo | |
| 6,875,837 B2 * | 4/2005 | Isogawa et al. | ................ 528/67 |
| 7,026,430 B2 | 4/2006 | Keller et al. | |
| 7,101,934 B2 | 9/2006 | Shimura et al. | |
| 7,122,588 B2 | 10/2006 | Fujisawa et al. | |
| 7,166,043 B2 | 1/2007 | Ohira | |
| 7,169,861 B2 | 1/2007 | Kim et al. | |
| 7,201,673 B2 | 4/2007 | Sasaki | |
| 7,297,750 B2 | 11/2007 | Ishino | |
| 7,485,052 B2 | 2/2009 | Matroni et al. | |
| 7,638,580 B2 | 12/2009 | Sasaki et al. | |
| 2004/0142765 A1 | 7/2004 | Kennedy, III et al. | |
| 2005/0249939 A1 * | 11/2005 | Barkac et al. | ................ 428/323 |
| 2006/0009308 A1 | 1/2006 | Isogawa et al. | |
| 2006/0030663 A1 * | 2/2006 | Andre et al. | ................ 524/588 |

* cited by examiner

*Primary Examiner* — David Buttner
(74) *Attorney, Agent, or Firm* — Diane R. Meyers

(57) ABSTRACT

A coating composition for a golf ball and a coated golf ball are disclosed. The coating composition comprises a polyurethane and a boron-containing compound that improves the adhesion of the coating to a printed image.

8 Claims, No Drawings

COATING COMPOSITIONS FOR GOLF BALLS AND COATED GOLF BALLS

FIELD OF THE INVENTION

The present invention relates to coated golf balls and to coating compositions for golf balls having improved adhesion properties.

BACKGROUND OF THE INVENTION

A golf ball generally comprises a one-piece construction or it may include several layers including a core and an outer cover surrounding the core. Typically, one or more layers of paint and/or clearcoat are applied to the exterior surface of the golf ball In one typical design, the exterior surface of the golf ball is first painted with at least one pigmented primer and/or basecoat followed by the application of a clear top coat. The basecoat and/or primer and clear topcoat are applied to the golf ball to enhance the aesthetic appearance of the ball as well as mask or cover surface blemishes that may have resulted from the manufacturing process. The clear top coat is particularly important, in that the coat protects any images, that is, trademarks, logos, or other markings that may be placed on the exterior surface of the golf ball. Customized golf balls contain an image such as a logo for a University or a company (other than the golf ball manufacturer) on the exterior surface of the clear coat.

Depending on the ink formulations used in depositing the images and the formulation of the clear topcoat, the adhesion between the image and the clear topcoat can fail. This is particularly so with images on the exterior surface of the clear coat. Failure is visually noticed by cracking or chipping of the image after repeated hits with a golf club.

Current clear topcoats are polyurethane polyols, usually poly(ester-urethane) polyols crosslinked with a polyisocyanate. To provide for enhanced mar and abrasion resistance, a so-called slip agent is included in the polyurethane coating formulation. It is believed that these slip agents can adversely affect the adhesion of the topcoat to the images, particularly the images on the exterior surface of the clear coat. To overcome these adhesion problems, an adhesion-promoting agent can be added to the formulations. However, many adhesion-promoting compounds are not effective.

SUMMARY OF THE INVENTION

The present invention provides a golf ball having a clear polyurethane topcoat applied to the outer layer of the golf ball; the topcoat being characterized as containing a boron-containing compound.

The invention also provides a coating composition for a golf ball comprising:
(A) a polyurethane polyol comprising:
(i) a polyester polyol,
(ii) a polyether polyol;
(B) a polyisocyanate;
(C) a polyether-modified polysiloxane; and
(D) a boron-containing compound.

DETAILED DESCRIPTION

Other than in the operating examples, or where otherwise indicated, all numbers expressing quantities of ingredients, reaction conditions and so forth used in the specification and claims are to be understood as being modified in all instances by the term "about". Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10, that is, having a minimum value equal to or greater than 1 and a maximum value of equal to or less than 10.

The term "polymer" is also meant to include homopolymer, copolymer and oligiomer.

Aliphatic and cycloaliphatic are designated (cyclo)aliphatic.

The clear polyurethane topcoat comprises the reaction product of a polyol and a polyisocyanate. Among the polyols that can be used are hydroxyl-containing acrylic polymers, hydroxyl-containing polyesters, i.e., polyester polyols including polyester-urethane)polyols, polyether polyols and mixtures thereof such as mixtures of poly(ester-urethane) polyols and polyether polyols.

Useful polyester polyols typically include the condensation products of polyhydric alcohols and polycarboxylic acids. Suitable polyhydric alcohols can include ethylene glycol, neopentyl glycol, 1,6-hexane diol, trimethylol propane, and pentaerythritol. Suitable polycarboxylic acids can include adipic acid, 1,4-cyclohexyl dicarboxylic acid, and hexahydrophthalic acid. Besides the polycarboxylic acids mentioned above, functional equivalents of the acids such as anhydrides where they exist or lower alkyl esters of the acids such as the methyl esters can be used. The ratio of reactants and reaction conditions are selected to result in a polyester polyol with the desired hydroxyl functionality.

For example, hydroxyl group-containing polyesters can be prepared by reacting an anhydride of a dicarboxylic acid such as hexahydrophthalic anhydride with a did such as a mixture of 1,6-hexane diol and neopentyl glycol in a 1:2 COOH/OH molar ratio.

Poly(ester-urethane)polyols can be prepared by reacting the polyester polyols such as those described above with a polyisocyanate, typically a diisocyanate. Examples of the diisocyanate include aliphatic, alicyclic, and aromatic diisocyanate compounds (i.e., aromatic diisocyanate compounds with or without isocyanate on their side chains) such as hexamethylene diisocyanate (HD), xylylene diisocyanate (XDI), hydrogenated xylylene diisocyanate ($H_6$XDI), isophorone diisocyanate (IPDI), tetramethyl xylylene diisocyanate (TMXDI), and hydrogenated diphenylmethane diisocyanate ($H_{12}$MDI). In particular, preferable example is non-yellowing diisocyanate (i.e., (cyclo)aliphatic or alicyclic diisocyanate).

In a typical production of the poly(ester-urethane)polyol, the diisocyanate and the polyester polyol are used at the equivalent ratio of polyol to isocyanate of 1.1 to 2.1:1.

Typically, the poly(ester-urethane)polyol has urethane bonds of 0.1 to 5 mmol/g with respect to 1 gram of the urethane polyol. The strength of the coating layer depends on the amount of urethane bond.

The poly(ester-urethane)polyol usually has Mw of 4000 or more, such as about 4500 or more and usually has Mw of below 10000, such as about 9000 or less.

The poly(ester-urethane)polyol can be produced by the following steps. The polyester polyol is diluted with solvent, and then is mixed with a reaction catalyst (for example, dibutyltin laurate). To the resultant mixture, a diisocyanate is added gradually to form urethane bonds.

Besides the poly(ester-urethane)polyols, the coating composition can contain additional polyols to optimize the properties of the clear topcoat. Examples of such polyols are low Mw dials such as ethylene glycol, diethylene glycol, triethylene glycol, butylene glycol, 1,3-butane diol, 1,4-butane did, neopentyl glycol, and 1,6-hexane diol; low Mw triols such as glycerin, trimethylol propane, and hexane triol; and polyether polyols (e.g. polyethylene glycol, polypropylene glycol, and polytetramethylene glycol). Polyether polyols such as polytetramethylene diol are particularly useful.

The poly(ester-urethane)polyol is usually present in the coating composition in amounts of 80 to 95 percent by weight, based on total weight of the polyol. Usually, the polyether polyol is present in amounts of 5 to 20 percent by weight based on total weight of the polyol.

The polyisocyanate is the curing agent for the polymeric polyol. The polyisocyanate can be selected from the following polyisocyanates: (cyclo)aliphatic, alicyclic, and aromatic polyisocyanates such as hexamethylene diisocyanate (HDI), xylylene diisocyanate (XDI), hydrogenated xylylene diisocyanate ($H_6$XDI), isophorone diisocyanate (IPDI), tetramethylxylylene diisocyanate (TMXDI), and hydrogenated diphenyl methane diisocyanate ($H_{12}$MDI). Especially preferable is a non-yellowing polyisocyanate (i.e., (cyclo)aliphatic or alicyclic diisocyanate compound). Also, higher isocyanates such as isocyanurates of diisocyanate can be used. These polyisocyanates may be used alone or in combination of two or more of them. Examples are mixtures of the isocyanurates of isophorone diisocyanate and 1,6-hexamethylene diisocyanate.

The polymeric polyols and the curing agent are mixed together into the coating material immediately before being applied to a golf ball body in such a manner that the equivalent ratio of the isocyanate groups (NCO) of the curing agent with respect to the hydroxyl groups (OH) of the polymeric polyol (i.e., NCO/OH ratio) is 0.9 to 1.5, and preferably 1.1 to 1.3.

To provide mar and abrasion resistance, the top coat compositions typically contain a slip agent. An example of a slip agent is a polyether-modified polysiloxane copolymer that is a linear or branched polysiloxane that is modified by polyether groups pendantly attached to the polysiloxane through silicon-carbon bonds or silicon-oxygen-carbon bonds. The polyether groups are most typically selected from polyethylene oxide and/or polypropylene oxide including mixed groups. Examples of slip agents are those available from BYK Chemie as BYK 300, 301, 302, 306 and 307. Other examples of slip agents are those available from Evonik Tego Chemie GmbH as TEGOGUIDE 410 and 440. The slip agent is typically present in the clear topcoat in amounts of 0.01 to 1.0 percent by weight based on resin solids of the coating composition.

It is believed that the slip agent when present in the composition adversely affects adhesion of the clear topcoat to the printed image, particularly on the exterior surface of the clear topcoat. To overcome this problem, the clear topcoat composition contains a boron compound. Examples of boron compounds are boron oxide, boric acid and boric acid esters such as trimethyl borate, triethyl borate, tri-n-propyl borate, tri-n-butyl borate, triphenyl borate, triisopropyl borate, tri-t-amyl borate, triphenylborate, trimethoxyboroxine, tri-2-cyclohexylcyclohexyl borate, triethanolamine borate, triisopropylamine borate, mannitol borate, glycerol borate and triisopropanolamine borate.

Examples of other boron compounds are organic oligomeric and polymeric compounds comprising boron-containing moieties. Suitable examples include polymeric borate esters, such as those formed by reacting an active hydrogen-containing polymer, for example, a hydroxyl functional group-containing acrylic polymer or polysiloxane polymer, with boric acid and/or a borate ester to form a polymer having borate ester groups.

Polymers suitable for this purpose can include any of a variety of active hydrogen-containing polymers such as those selected from at least one of acrylic polymers, polyester polymers, polyurethane polymers, polyether polymers and silicon-based polymers. As used herein, by "silicon-based polymers" is meant a polymer comprising one or more —SiO— units in the backbone. Such silicon-based polymers can include hybrid polymers, such as those comprising organic polymeric blocks with one or more —SiO— units in the backbone.

In one embodiment of the present invention, the boron-containing compound comprises a polysiloxane borate ester formed from reactants (A) at least one polysiloxane comprising at least one of the following structural units (I):

$$R^1_n R^2_m SiO_{(4-n-m)/2} \quad (I)$$

wherein each $R^1$, which may be identical or different, represents H, OH, a monovalent hydrocarbon group or a monovalent siloxane group; each $R^2$, which may be identical or different, represents a group comprising at least one reactive functional group, wherein m and n fulfill the requirements of 0<n<4, 0<m<4 and 2≤(m+n)<4; and (B) at least one boron-containing compound selected from at least one of boric acid, and boric acid esters.

It should be understood that the "at least one polysiloxane comprising at least one structural unit (I)" above is a polymer that contains at least two Si atoms per molecule. It should also be understood that the at least one polysiloxane can include linear, branched or cyclic polysiloxanes.

Moreover, as used herein, "formed from" denotes open, e.g., "comprising", claim language. As such, it is intended that a composition "formed from" a list of recited components be a composition comprising at least these recited components, and can further comprise other, nonrecited components, during the composition's formation.

Also, as used herein, the term "reactive" refers to a functional group that forms a covalent bond with another functional group under conditions sufficient to cure the composition.

As used herein, the phrase "each component is different" refers to components that do not have the same chemical structure as other components in the composition.

Each of m and n depicted in the at least one structural unit (I) above fulfill the requirements of 0<n<4, 0<m<4 and 2≤(m+n)<4. When (m+n) is 3, the value represented by n can be 2 and the value represented by m is 1. Likewise, when (m+n) is 2, the value represented by each of n and m is 1.

The clear topcoat composition usually contains a catalyst to promote cure. Examples of catalysts are those well known in the art to facilitate urethane cure. Specific examples are organotin compounds such as dibutyltin dilaurate and metal octoate compounds such as zinc octoate. The catalyst is typically present in amounts of 0 to 2.0 percent by weight based on weight of resin solids in the coating composition.

Other additives can be included in the clear topcoat composition. These additives include UV stabilizers and absorbers, leveling agents and optical brighteners. These materials are added in amounts of 0-20 percent by weight based on weight of resin solids.

The clear topcoat composition usually contains a solvent. Suitable solvents include methyl isobutyl ketone, methyl amyl ketone, methyl isoamyl ketone, butyl acetate and propylene glycol monomethyl ether acetate, or mixtures thereof. Typically the solvent is present in an amount of 20 to 60 percent, such as 25 to 55 percent by weight, based on the total weight of the coating composition. Urethane grade solvents (low moisture content) are typically used.

The golf balls to which the clear topcoat compositions are applied are commonly one-piece, two-piece or three-piece constructions. One-piece balls are made from a homogeneous polymer shaped into a golf ball. Two-piece golf balls comprise a core and an outer surrounding polymeric cover. Three-piece (or more) golf balls comprise various combinations of a core (wound or unwound), one or more intermediate polymeric shells and an outer polymeric cover. The cover polymer used in two-piece and three-piece balls may, for example, be balata, an ionomeric polymer (e.g., SURLYN) or a polyurethane.

Golf ball covers are commonly painted with a primer coat, which may be colored (e.g., white). Alternately, the cover itself may contain a colorant.

The clear topcoat composition is then applied over the surface of the golf ball. The clear topcoat composition can be applied by any known method such as spray gun coating such as electrostatic coating. Since the clear topcoat composition is a polyurethane two-pack coating material consisting of separate packages of the polyol and polyisocyanate components, the two components can be mixed in advance or immediately before applied to the ball surface.

The applied coating material is cured by drying to form a coating layer. The drying temperature is preferably below 50° C., but not limited thereto. The drying time can be determined according to coating material components. The preferable drying time is 0.5 to 5 hours.

The coating layers typically have a thickness of 5 to 30 μm.

Most commonly, images, such as trademarks. logos and other markings are applied to the outer surface of the one-piece golf balls, or to the polymeric cover of the multi-piece golf balls, to the colored primer/base coat and to the clear coat by a pad printing process and apparatus. Pad printing uses an etched image plate (i.e., a cliché) having a negative etching of the desired image. During pad printing, ink is applied to the image plate, thus filling the etched areas. Excess ink is then scraped off of the image plate, leaving behind ink only within the etched image. A printing pad is then momentarily lowered and pressed onto the inked image plate to lift ink off of the etched ink filled cavity onto the printing pad. The ink so lifted defines the shape of the etched image. The inked pad is then momentarily lowered and pressed onto the golf ball, thereby releasing the ink from the pad to the golf ball. The ink released from the pad forms, on the spherical surface of the ball, an image corresponding to that of the etched cavity.

EXAMPLES

The following examples show the preparation of a clear topcoat composition for application to the outer surface of a golf ball containing a printed image. The clear topcoat composition was a two-package system comprising a poly(ester-urethane)polyol package and a (cyclo)aliphatic polyisocyanate curing agent package.

Example A

This example illustrates high solids compositions comprising a polyester-urethane)polyol, and the method of preparing same. First, a polyester-polyol composition was prepared, as follows:

| Ingredients | Parts by Weight |
|---|---|
| Hexahydrophthalic anhydride | 3380 |
| 1,6-Hexane diol | 2590 |
| Neopentyl glycol | 2540 |

The above ingredients were charged to a properly equipped reaction vessel and the resultant mixture was then heated to react in a nitrogen atmosphere. At 170° C. (338° F.), there resulted the production of water of (esterification) reaction. With the continuous removal of the water, heating was continued to 200° C. (392° F.). The reaction mixture was then held at 200° C. (392° F.) for about 9 hours until an acid value of about 9.5 was attained. The resultant mixture was then cooled to a temperature of about 70° C. (158° F.), discharged and analyzed.

Theoretical solids content was 100 percent, viscosity was 95.6 stokes, acid value was 9.5 and hydroxyl value was 319.5.

Example B

A poly(ester-urethane)polyol was prepared with the above polyester-polyol composition, as follows:

| Ingredients | Parts by Weight |
|---|---|
| The polyester-polyol (as described above) | 8500 |
| Trimethyl hexamethylene diisocyanate | 1500 |
| Dibutyltin dilaurate | 0.90 |
| Methylisobutyl ketone | 201 |
| Propylene glycol | 60.00 |

The above ingredients were charged to a properly equipped reaction vessel and the resultant mixture heated to react in a nitrogen atmosphere to a temperature of 110° C. (230° F.). The reaction mixture was held at this temperature for about 2½ hours until all the isocyanate had reacted. The resultant composition was discharged and analyzed.

Theoretical solids content was 97 percent, acid value was 7.9 and hydroxyl value was 180.2.

Example C

This example shows the preparation of a polysiloxane polyol that was subsequently used to form the polysiloxane borate of Example D. The polysiloxane polyol was a product of the hydrosilylation of a reactive silicone fluid having an approximate degree of polymerization of 3 to 7, i.e., $(Si-O)_3$ to $(Si-O)_7$. The polysiloxane polyol was prepared from the following mixture of ingredients:

| Ingredients | Equivalent Weight | Equivalents | Parts by Weight |
|---|---|---|---|
| Charge I: | | | |
| Trimethylolpropane monoallyl ether | 174.0 | 756.0 | 131.54 |
| Charge II: | | | |
| MASILWAX BASE[1] | 156.7[2] | 594.8 | 93.21 |
| Charge III: | | | |
| Chloroplatinic acid | | 10 ppm | |
| Toluene | | | 0.23 |
| Isopropanol | | | 0.07 |

[1]Polysiloxane-containing silicon hydride, commercially available from BASF Corporation.
[2]Equivalent weight based on mercuric bichloride determination.

To a suitable reaction vessel equipped with a means for maintaining a nitrogen blanket, Charge I and an amount of sodium acetate equivalent to 20 to 25 ppm of total monomer solids was added at ambient conditions and the temperature was gradually increased to 75° C. under a nitrogen blanket. At that temperature, about 5.0 percent of Charge II was added under agitation, followed by the addition of Charge III, equivalent to 10 ppm of active platinum based on total monomer solids. The reaction was then allowed to exotherm to 95° C. at which time the remainder of Charge II was added at a rate such that the temperature did not exceed 95° C. After completion of this addition, the reaction temperature was maintained at 95° C. and monitored by infrared spectroscopy for disappearance of the silicon hydride absorption band (Si—H, 2150 cm$^{-1}$).

Example D

A four-neck reaction flask equipped with stirrer, temperature probe, Dean Stark trap and reflux condenser was flushed with N2. The following materials were charged to the flask and blended under agitation: 180.4 g of the polysiloxane polyol of Example C, 300.9 g of isopropyl alcohol and 25.8 g of boric acid. The mixture was heated to reflux at a temperature of 79° C., and 200 ml of solvent was removed over 0.25 hours. The resulting material was cooled and measured to have 49.8% solids and contained 3.0 percent water.

Example 1

The following example is a clear top coat composition prepared from the ingredients shown below:

| Ingredients | Parts by Weight |
|---|---|
| Methyl isobutyl ketone | 248.09 |
| Diisobutyl ketone | 35.30 |
| TINOPAL 013[1] | 1.60 |
| Cellulose acetate butyrate | 27.92 |
| TINUVIN 928[2] | 10.21 |
| Poly(ester-urethane) polyol of Example B | 319.49 |
| Polytetramethylene glycol[3] | 33.43 |
| BYK 307[4] | 3.62 |
| Polysiloxane borate of Example D | 6.36 |
| Dibutyltin dilaurate | 5.80 |
| Methyl isobutyl ketone | 32.57 |
| Methyl acetate | 51.24 |

[1]Optical brightener from Ciba Specialty Chemicals.
[2]UV absorber from Ciba Specialty Chemicals.
[3]$M_w$ of 900-1100 available from Lyondell as Polymeg1000.
[4]Slip agent.

The above ingredients were mixed together in the order indicated to form a clear topcoat composition having a solids content of 45 to 55 percent.

The clear coating composition could be applied to two-piece golf balls having a white primer to which was printed a trademark and a logo. After curing of the clear coat a logo was printed on the exterior surface of the clear coat. After repeated hits of the golf ball with a golf club, the images of the trademark and logo beneath the clear coat and on the exterior surface of the clear coat were clear and sharp. When the clear coat composition did not contain the polysiloxane borate ester, the logo on the exterior surface of the clear coat was chipped and cracked after repeated hits of the golf ball with a golf club.

The invention claimed is:

1. A coating composition for a golf ball comprising:
   (A) 20 to 40 percent by weight of a polymeric polyol comprising:
      (i) 80 to 95 percent by weight of a polyurethane polyol,
      (ii) 5 to 20 percent by weight of a polytetramethylene ether glycol;
   (B) 30 to 50 percent by weight of a polyisocyanate,
   (C) 0.01 to 1 percent by weight of a polyether-modified polysiloxane; and
   (D) 0.2 to 2.0 percent by weight of a boron-containing compound;
   the percentage by weight of (i) and (ii) being based on total weight of (i) and (ii), and the percentage by weight of (A), (B), (C) and (D) being based on total weight of the coating composition.

2. The coating composition of claim 1 in which the polyurethane polyol is a polyester-urethane)polyol.

3. The coating composition of claim 1 in which the polyisocyanate is a (cyclo)aliphatic polyisocyanate.

4. The coating composition of claim 3 in which the (cyclo)aliphatic polyisocyanate is an isocyanurate.

5. The coating composition of claim 4 in which the isocyanurate is a mixture of the isocyanurates of hexamethylene diisocyanate and isophorone diisocyanate.

6. The coating composition of claim 1 in which the boron-containing compound is selected from boric acid and boric acid esters.

7. The coating composition of claim 6 in which the boric add ester is a polysiloxane borate.

8. The coating composition of claim 7 in which the polysiloxane borate is the reaction product of:
   (A) $R^1{}_n R^2{}_m SiO_{(4-n-m)/2}$ wherein each $R^1$, which may be identical or different, represents H, OH, a monovalent hydrocarbon group or a monovalent siloxane group; each $R^2$, which may be identical or different, represents a group comprising one or more active hydrogens; m and n each represent a positive number fulfilling the requirements of $0<m<4$, $0<n<4$ and $2\le(m+n)<4$; and
   (B) a boron-containing compound selected from boric acid and boric acid esters and mixtures thereof.

\* \* \* \* \*